United States Patent [19]

Yamada et al.

[11] Patent Number: 5,004,301

[45] Date of Patent: Apr. 2, 1991

[54] MODULATOR FOR USE IN AN ANTI-LOCK BRAKE CONTROL SYSTEM

[75] Inventors: Shinji Yamada; Teruhisa Kohno; Koji Takata, all of Itami, Japan

[73] Assignee: Sumitomo Electric Industries, Ltd., Osaka, Japan

[21] Appl. No.: 414,255

[22] Filed: Sep. 29, 1989

[30] Foreign Application Priority Data

Sep. 30, 1988 [JP] Japan .................. 63-248717

[51] Int. Cl.⁵ .............................................. B60T 8/42
[52] U.S. Cl. ...................................... 303/115; 303/116
[58] Field of Search ............. 188/181 A; 303/61, 113, 303/114, 115, 117, 119

[56] References Cited

U.S. PATENT DOCUMENTS

| | | | |
|---|---|---|---|
| 3,851,930 | 12/1974 | Grosseau | 188/181 A X |
| 4,685,749 | 8/1987 | Otsuki et al. | |
| 4,715,666 | 12/1987 | Farr | 303/116 |

FOREIGN PATENT DOCUMENTS

| | | |
|---|---|---|
| 0265885 | 10/1987 | European Pat. Off. |
| 0332399 | 3/1989 | European Pat. Off. |
| 2945444 | 11/1979 | Fed. Rep. of Germany |
| 3438646 | 10/1984 | Fed. Rep. of Germany |
| 2036222 | 6/1980 | United Kingdom |

*Primary Examiner*—Duane A. Reger
*Attorney, Agent, or Firm*—Cushman, Darby & Cushman

[57] ABSTRACT

An anti-lock brake control system for an automobile is provided with a master cylinder, a main fluid passage communicating between the master cylinder and at least one wheel brake, a recirculating passage branched off from the main fluid passage for recirculating a fluid medium back to the main fluid passage, a pump disposed in the recirculating passage for recirculating the fluid medium, a pressure regulator for reducing or increasing the brake pressure of the wheel brake and an anti-lock modulator for changing the area of the main fluid passage. The modulator is provided with a housing having a fluid chamber, a first port communicating with the master cylinder and a second port communicating with the pump, and with a movable element vertically movably accommodated in the fluid chamber. The movable element is normally located at a lower position in the fluid chamber by the gravity and moved upwards by the flow of the fluid medium discharged from the pump. The modulator is so constructed as to reduce the area of the main fluid passage when the movable element is moved upwards.

7 Claims, 4 Drawing Sheets

MODULATOR FOR USE IN AN ANTI-LOCK BRAKE CONTROL SYSTEM

BACKGROUND OF THE INVENTION

1. Field of the Invention

The present invention generally relates to an anti-lock brake control system for preventing lockup of vehicle wheel brakes during braking of the vehicle, and more particularly, to an anti-lock modulator constituting part of the anti-lock brake control system of a recirculation type, which is adapted to prevent pulsations of delivery pressure from a pump to a master cylinder. In the anti-lock brake control system, working fluid is discharged to a recirculating passage from wheel brakes when the anti-lock brake control is effected, so that the working fluid is recirculated to the master cylinder by the pump provided in the recirculating passage.

2. Description of the Prior Art

Nowadays, the use of an anti-lock brake control system has been spreading in general automobiles except relatively small ones. Accordingly it is urgently required to make a system which is also applicable to small automobiles, with reduced size and manufacturing cost.

Japanese Patent Publication No. 49-28307 (German Patent No. 719446) discloses such an anti-lock brake control system as referred to above for satisfying the recent requirement. The system disclosed therein includes;

(a) a recirculating passage branched off from a main fluid passage connecting a master cylinder and wheel brakes so as to recirculate the working fluid back to a recirculation point located upstream of the branch point in the main fluid passage with respect to the direction of flow towards the wheel brakes, (b) a pump provided in the recirculating passage for recirculating the working fluid, and (c) a pressure adjusting means which reduces the pressure applied to the wheel brakes by discharging the working fluid from the branch point to the recirculating passage, and increases the pressure to the wheel brakes by supplying the working fluid from the main fluid passage to the wheel brakes through the branch point.

The system of this kind will be referred to as a recirculating type hereinbelow.

In the anti-lock brake control system mentioned above, the pressure adjusting means is provided with a solenoid-operated input valve in the main fluid passage between the recirculation point and the branch point and a solenoid-operated output valve in the recirculating passage between the branch point and the pump. The input and out valves are normally open and closed, respectively. Therefore, the brake pressure is controlled when the anti-lock brake control is being performed by switching these two valves in three modes, that is, pressure reducing mode, pressure holding mode and pressure increasing mode.

Similar to the above anti-lock brake control system of the recirculating type, British Patent Application No. 8512610 proposes a system for performing the anti-lock brake control in two modes, namely, a pressure reducing mode and a pressure gradually increasing mode using one solenoid valve for each one wheel. In this system, a flow control valve which is not solenoid-operated is used in place of the solenoid-operated input valve.

According to the conventional anti-lock brake control systems of the recirculating type described above, when the brake pressure is reduced in the anti-lock operation, the working fluid discharged out of each wheel brake is recirculated between the master cylinder and the pressure adjusting means by the pump. Because of this, there arise several problems, for example, vibrations of a brake pedal resulting from pulsations of delivery pressure from the pump, noises caused by vibrations of pipings, or the like.

In view of the above, various improvements have been proposed to reduce the transmission of pressure pulsations from the pump towards the master cylinder. For example, a throttle is provided between an outlet of the pump and the recirculation point, with an accumulator arranged between the throttle and the outlet of the pump as disclosed in German Patent Application No. 2643860. Japanese Patent Publication Nos. 56-142733 and 61-16656 disclose such an improved method where a check valve is provided between the recirculation point and the master cylinder so as to normally direct the working fluid from the master cylinder to the recirculation point, thereby preventing the transmission of the delivery pressure of the pump to the master cylinder. On the other hand, Japanese Utility Model Laid-open Publication No. 63-98869 proposes to prevent the transmission of the pressure pulsations from the pump to the master cylinder by utilizing a piston operated by the delivery pressure of the pump. When the pump is driven, the piston is moved to restrict the fluid passage through the master cylinder and the recirculation point with a throttle.

However, the above-described conventional methods for preventing the transmission of the pressure pulsations of the pump have encountered various problems.

More specifically, according to the method disclosed in German Patent Application No. 2643860, the total amount of the working fluid discharged from the pump must pass through the throttle, requiring that the delivery pressure of the pump be increased, thereby imposing a larger load upon the pump. Further, the housing structure is larger in size because of the high pressure accumulator. Additionally, a plug and the like are necessitated.

According to the method of Japanese Patent Publication No. 56-142733, an accumulator is also required between the outlet of the pump and the check valve, resulting in a bulky system structure and increased manufacturing cost.

Moreover, according to the method disclosed in Japanese Utility Model Laid-open Publication No. 63-98869, when the normal braking operation is carried out, the piston is moved, resulting disadvantageously in an increased stroke of the brake pedal. In addition, the structure becomes complicated and the manufacturing cost increases.

SUMMARY OF THE INVENTION

Accordingly, the present invention has been developed with a view to substantially eliminating the above described disadvantages inherent in the prior art modulators for use in an anti-lock brake control system of an automobile, and has for its primary object the provision of an improved anti-lock modulator which is capable of effectively restricting the transmission of pressure pulsations of working fluid discharged from a pump to a master cylinder, thereby preventing the increase of load imposed upon the pump and the increase of the stroke of the brake pedal during a normal braking operation.

Another important object of the present invention is to provide an anti-lock modulator of the above described type which is simple in construction and stable in functioning, and can be readily manufactured at a low cost.

In accomplishing these and other objects, according to the present invention, the anti-lock modulator is provided with a switching means for switching the area of the main fluid passage between a master cylinder and a recirculation point so that the area is increased when the pump is out of operation i.e., when the anti-lock brake control system is not effected, whereas the area is reduced when the pump is in operation i.e., when the anti-lock brake control system is effected. Accordingly, when the pump is out of operation, a relatively wide fluid passage is ensured between the master cylinder and the recirculation point, thereby avoiding the delay in effectuation the wheel brake or in returning of a brake pedal during the normal braking operation. In contrast, when the pump is in operation, the fluid passage between the master cylinder and the recirculation point is restricted, and accordingly, pressure pulsations of working fluid discharged from the pump are transmitted to the master cylinder in a reduced amount. Moreover, when the anti-lock brake control is being carried out, the working fluid discharged from the pump is partly led through a pressure adjusting means to the wheel brake and the whole of the discharged fluid does not pass through the throttle so that the load imposed upon the pump does not increase as much.

More specifically, an anti-lock brake control system for an automobile includes a master cylinder, a main fluid passage communicating between the master cylinder and at least one wheel brake, a recirculating passage branched off from the main fluid passage for recirculating a fluid medium back to the main fluid passage via a recirculation point located upstream of a branch point with respect to the direction of flow towards the wheel brake, a pump disposed in the recirculating passage for recirculating the fluid medium, and a pressure adjusting means for reducing a brake pressure of the wheel brake by discharging the fluid medium from the wheel brake to the recirculating passage, and for increasing the brake pressure by supplying the fluid medium from the main fluid passage to the wheel brake.

The anti-lock brake control system is further provided with an anti-lock modulator according to the present invention. The modulator is provided with a housing having a fluid chamber formed therein, a first port communicating with the master cylinder and a second port communicating the pump, and with a movable element vertically movably accommodated in the fluid chamber. The movable element is normally located at a lower position in the fluid chamber by gravity and moved upwards by the flow of the fluid medium discharged from the pump. Furthermore, the modulator is so constructed as to reduce an area of the main fluid passage when the movable element is moved upwards.

As described hereinabove, according to the present invention, since the passage area switching means is provided between the master cylinder and the recirculation point where the recirculating passage meets the main fluid passage, the fluid passage from the pump to the master cylinder is automatically restricted when the pump is operated in the anti-lock condition. Accordingly, it is possible to reduce pressure pulsations of the fluid medium to be transmitted from the pump to the brake pedal through the master cylinder. On the other hand, when the pump is not operated in the lockup condition, the switching means ensures the relatively wide fluid passage communicating with the main fluid passage. As a result, the delay in effectuation of the wheel brake or in returning the brake pedal can be avoided.

BRIEF DESCRIPTION OF THE DRAWINGS

These and other objects and features of the present invention will become apparent from the following description taken in conjunction with the preferred embodiments thereof with reference to the accompanying drawings, throughout which like parts are designated by like reference numerals, and in which.

DETAILED DESCRIPTION OF THE PREFERRED EMBODIMENTS

Figure 1:
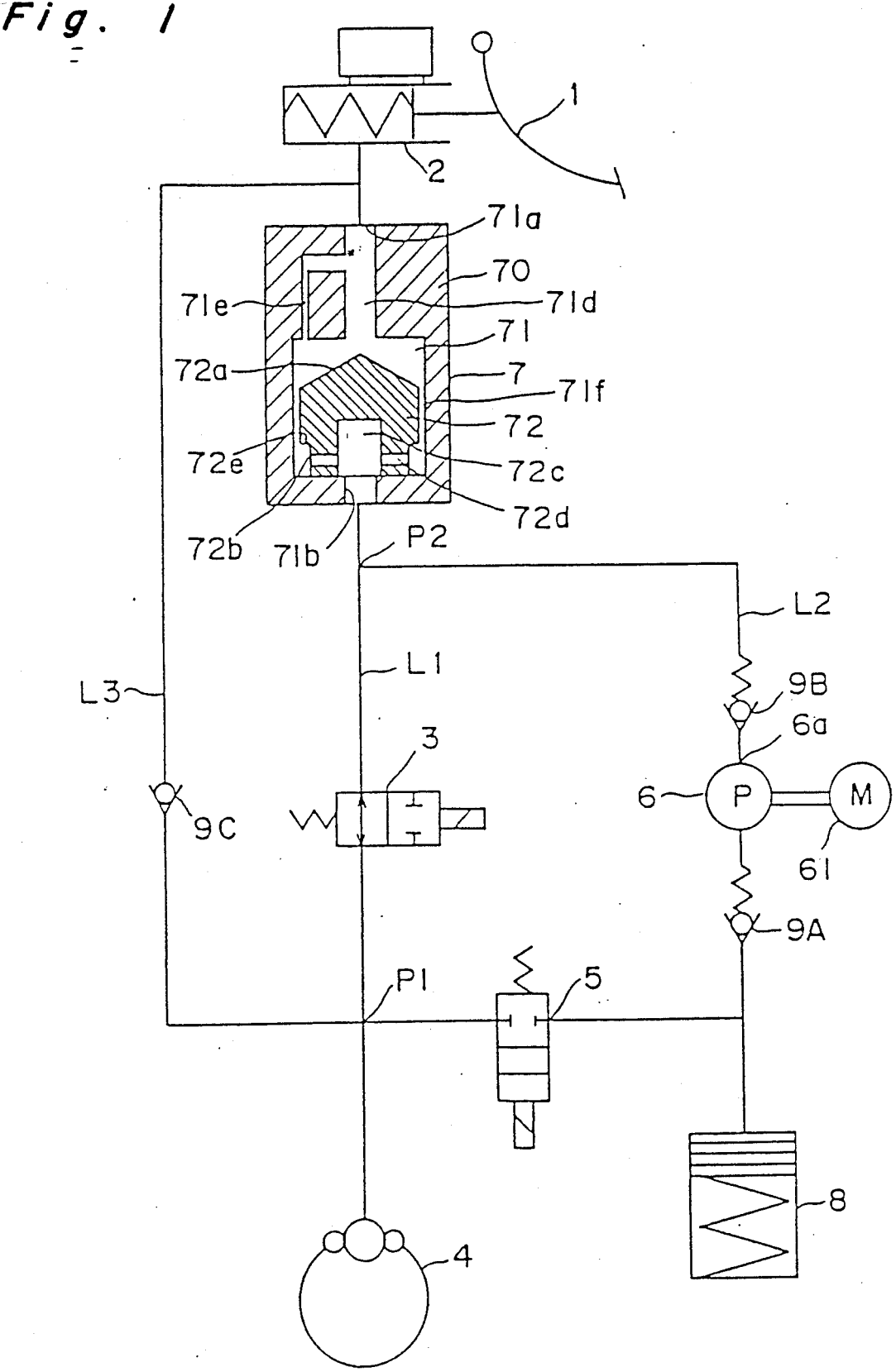
FIG. 1 is a schematic diagram showing the whole anti-lock brake control system provided with a modulator according to a first embodiment of the present invention.

Referring now to the drawings, there is shown in FIG. 1 an anti-lock brake control system which is provided with a passage area switching means 7 according to a first embodiment of the present invention. In FIG. 1, reference numerals 1, 2 and 4 designate a brake pedal, a master cylinder actuated by the brake pedal 1, and one of the wheel brakes, respectively. L1 is a main fluid passage communicating the master cylinder 2 and with the wheel brake 4. L2 is a recirculating passage which is branched off from the main fluid passage L1 at a branch point P1 and meets the main fluid passage L1 again at a recirculation point P2 located on the upstream side of the branch point P1. A solenoid valve 3 is placed between the branch point P1 and the recirculation point P2, and another solenoid valve 5 is provided in the recirculating passage L2. The system is provided with a pump 6 between the solenoid valve 5 and the recirculation point P2 in the recirculating passage L2 for recirculating the working fluid.

The solenoid valve 3 is normally open and the solenoid valve 5 is normally closed. When the pressure applied to the wheel brake is to be reduced during the lockup condition, the solenoid valve 3 is closed while the solenoid valve 5 is opened, so that the working fluid is discharged from the wheel brake 4 to the recirculating passage L2. Thus, the brake pressure in the wheel brake 4 is reduced. On the contrary, when the brake pressure is to be increased again, the solenoid valve 3 is opened and the solenoid valve 5 is closed, thereby supplying the working fluid from the main fluid passage L1 downstream of the recirculation point P2 to the wheel brake 4, to increase the pressure to the wheel brake 4. As described above, the solenoid valves 3 and 5 constitute a pressure adjusting means for adjusting the wheel brake pressure.

In the main flow passage L1, a passage area switching means 7 characterizing the anti-lock modulator according to the present invention is interposed between the master cylinder 2 and the recirculation point P2. As shown in FIG. 1, the passage area switching means 7 is provided with a housing 70, which has a vertically elongated fluid chamber 71 formed therein. A first port 71a is formed to communicate the upper end of the fluid chamber 71 with the master cylinder 2 via the main fluid passage L1. A second port 71b is formed to communicate the lower end of the fluid chamber 71 with a discharge opening 6a of the pump 6. In this embodiment, the recirculation point P2, where the recirculating passage L2 meets the main fluid passage L1, is located in the main fluid passage L1 between the second port 71b of the passage area switching means 7 and the input valve 3.

As indicated in FIG. 1, a fluid passage 71d having a large diameter and a fluid passage 71e having a relatively small diameter are formed in parallel with each other in the housing 70 of the passage area switching means 7. The first port 71a communicates with the fluid chamber 71 by both the fluid passages 71d and 71e. Moreover, the vertical axis of the fluid passage 71d is arranged to coincide with that of the fluid chamber 71. A movable element 72 is accommodated within the fluid chamber 71 and is capable of moving in the vertical direction. Although the movable element 72 is made of a light material such as plastic, it is generally located, as shown in the drawing, in the vertically lower part of the chamber by gravity. The outer peripheral surface of the movable element 72 is spaced from the inner surface of the fluid chamber by a gap 71f, which serves as a throttle. It is to be noted here, however, that the gap 71f should function less effectively as a throttle than the fluid passage 71e of the relatively small diameter. The upper surface of the movable element 72 is formed into a conical surface 72a. Therefore, when the movable element 72 is raised, the fluid passage 71d having the relatively large diameter is closed by the upper protruding portion of the surface 72a although the fluid passage 71e of the small diameter is kept open. Moreover, the movable element 72 is provided with a stepped portion 72b of a small diameter at its lower side, an opening 72c confronting the second port 71b in the center of its lower portion, and fluid passages 72d formed from the opening 72c towards opposite lateral surfaces of the stepped portion 72b. Accordingly, when the working fluid discharged from the pump 6 flows into the fluid chamber 71 through the second port 71b, the flow of the working fluid is caused to pass through the opening 72c and fluid passage 72d to the gap 71f. In this event, the movable element 72 is moved upwards because of the viscosity of the working fluid passing through the gap 71f.

In a similar manner to the prior art, the pump 6 is driven by an electric motor 61, and a reservoir 8 is provided between the solenoid valve 5 in the recirculating passage L2 and the pump 6, with check valves 9A and 9B respectively between the reservoir 8 and the pump 6 and, between the pump 6 and the recirculation point P2. The working fluid discharged into the recirculating passage L2 is accordingly recirculated only in a direction from the branch point P1 to the recirculation point P2.

There is formed a fluid passage L3 parallel to the passage area switching means 7 and the solenoid valve 3 so as to communicate the master cylinder 2 with the wheel brake 4. A check valve 9C is mounted in the fluid passage L3.

The operation of the above described first embodiment will be described hereinbelow.

During the normal braking operation, i.e., when the anti-lock brake control is not effected, the solenoid valve 3 is opened and the solenoid valve 5 is closed as shown in FIG. 1, and the pump 6 is out of operation. Therefore, the working fluid discharged from the pump 6 is not introduced through the second port 71b into the fluid chamber 71 of the passage area switching means 7. The movable element 72 is accordingly located in the vertically lower end of the chamber because of gravity, and both the fluid passage 71d of the large diameter and the fluid passage 71e of the small diameter communicating with the master cylinder 2 are kept open. Thus, a relatively wide fluid passage is ensured for the working fluid between the first port 71a communicating with the master cylinder 2 and the second port 71b communicating with the recirculation point P2 of the main fluid passage L1.

In the above-described state, the working fluid is supplied from the master cylinder 2 to the wheel brake 4 through the main fluid passage L1, passage area switching means 7 and solenoid valve 3 according to the operation of the brake pedal 1. Since the relatively wide fluid passage is ensured in the passage area switching means 7 at the time of the normal braking operation, no such problems as the delay in effectuation of the brake or in returning of the brake pedal are generated.

On the other hand, for the anti-lock operation, the solenoid valves 3 and 5 are operated, i.e., the solenoid valve 3 is closed and the solenoid valve 5 is opened, and the pump 6 is brought into operation. Therefore, the working fluid is discharged from the wheel brake 4 to the recirculating passage L2 to be returned to the recirculation point P2 by the pump 6. Subsequently, the working fluid discharged from the pump 6 is introduced into the second port 71b of the passage area switching means 7, whereby the light movable element 72 is moved upwards, closing the fluid passage 71d by the conical surface 72a thereof, but keeping the fluid passage 71e open. In other words, when the pump 6 is driven in the anti-lock condition, the passage between the master cylinder 2 and the recirculation point P2 is restricted to be small by the passage area switching means 7. As a result of this, pulsations of delivery pressure of the pump 6 transmitted to the master cylinder 2 and the brake pedal 1 are favorably reduced.

Meanwhile, when the brake pressure is increased again after the reduction thereof in the anti-lock operation, i.e., when the solenoid valve 3 is opened and the solenoid valve 5 is closed, part of the working fluid discharged from the pump 6 is supplied from the recirculation point P2 through the solenoid valve 3 to the wheel brake 4. In the manner as above, the whole of the working fluid from the pump 6 is prevented from flowing through the small passage (throttle) 71e in the passage area switching means 7, so that the overload of pump 6 is lessened.

Further, when a driver wants to reduce the brake pressure while the pump 6 is in operation, and reduces pressure on the brake pedal 1, the working fluid bypasses the recirculating passage L2 and the passage area switching means 7 constituting the narrow fluid passage and is discharged from the wheel brake 4 to the master cylinder 2 through the fluid passage L3.

FIG. 2 shows a system provided with an anti-lock modulator according to a second embodiment of the present invention. The main difference is that a passage area switching means 7 is placed at a position where the recirculating passage L2 meets the main fluid passage L1 in the second embodiment. The fluid chamber 71 of the passage area switching means 7 serves as the recirculation point. Therefore, a third port 71c is formed in the lateral surface of the fluid chamber 71 to communicate with a flow control valve 30 through the main fluid passage L1. The flow control valve 30 constitutes a pressure adjusting means and is provided in place of the solenoid valve 3 in the first embodiment.

The modulator according to the second embodiment will be described hereinbelow in detail.

The third port 71c is formed substantially in the middle of the side wall of the fluid chamber 71. The other portions of the passage area switching means 7 have the same structure as in the first embodiment. Specifically, the first port 71a is formed at the upper end of the fluid chamber 71 to communicate with the master cylinder 2 through the main fluid passage L1. The second port 71b is provided in the lower end of the fluid chamber to communicate with the discharge opening 6a of the pump 6 through the recirculating passage L2. The movable element 72 is so accommodated within the fluid chamber 71 as to be movable in the vertical direction. The third port 71c is formed adjacent to the opening end of the fluid passage 71e of the small diameter, and so arranged as not to be closed by the movable element 72 when the movable element 72 is raised. Upon closure of the fluid passage 71d of the large diameter subsequent to the rise of the movable element 72, a fluid passage is ensured by which the fluid passage 71e communicates with the third port 71c.

As shown in FIG. 2, the flow control valve 30 has a spool 32 fitted slidably in the axial direction thereof within a bore 31a of a housing 31. In the housing 31, there are formed an inlet 31b communicating with the third port 71c through the main fluid passage L1, a first outlet 31c communicating with the wheel brake 4 through the main fluid passage L1, and a second outlet 31d communicating with the solenoid valve 5 through the recirculating passage L2. Furthermore, the inlet 31b and outlets 31e and 31f branched from the first outlet 31c are open in the side surface of the bore 31a while the second outlet 31d is open in one end face of the bore 31a.

Axially-extending first fluid passage 35A and second fluid passage 35B are formed in the spool 32 slidably fitted in the bore 31a, with an orifice 33 being formed between these two fluid passages 35A and 35B. The spool 32 has a groove 32a formed in the outer periphery thereof at a position near the inlet 31b, with which groove communicates with a fluid passage 32b formed in the diametrical direction of the spool 32. Furthermore, an outer peripheral groove 32c and a diametrically-extending fluid passage 32d, and an outer peripheral groove portion 32e and a diametrically-extending fluid passage 32f are formed in the spool 32 on the upper and lower sides of the orifice 33. The grooves 32a, 32c and 32e communicate with or shut off from the inlet 31b, and outlets 31e and 31f, respectively, subsequent to the movement of the spool 32. The outward opening end of each groove is of a metal edge. Further, the lower end of the spool 32 is so formed as to serve as a spring receiver 32g. A compression spring 34 is mounted between the lower end of the spool 32, i.e., the spring receiver 32g and the end face of the bore 31a. The above second outlet 31d is formed at the lower end of the bore 31a so as to communicate with a pressure reducing chamber 36 formed in the lower portion of the spool 32.

The operation of to the second embodiment will be explained hereinbelow.

Figure 2A:
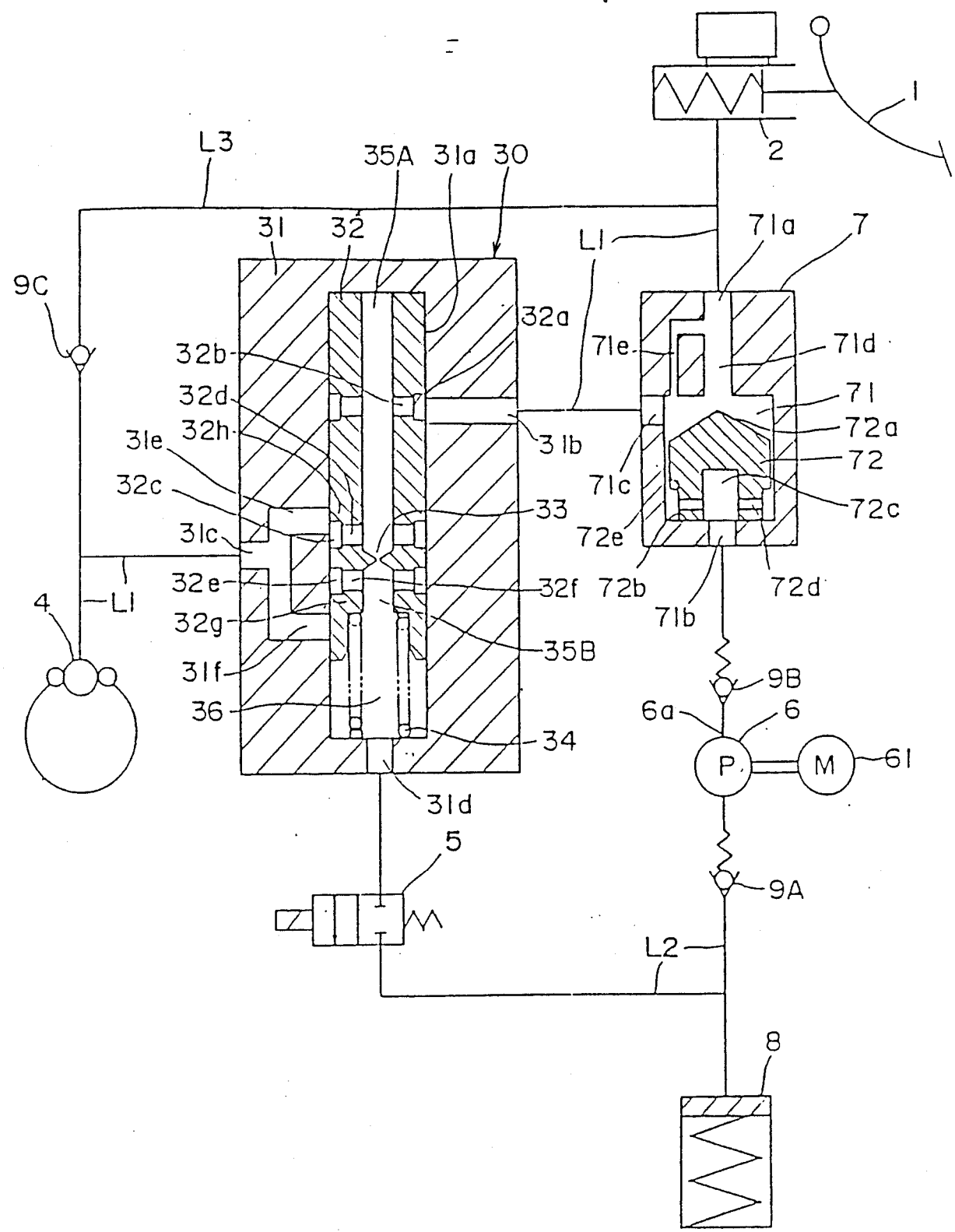
FIG. 2a is a view similar to FIG. 1, which particularly shows a modulator according to a second embodiment of the present invention.
Figure 2B:
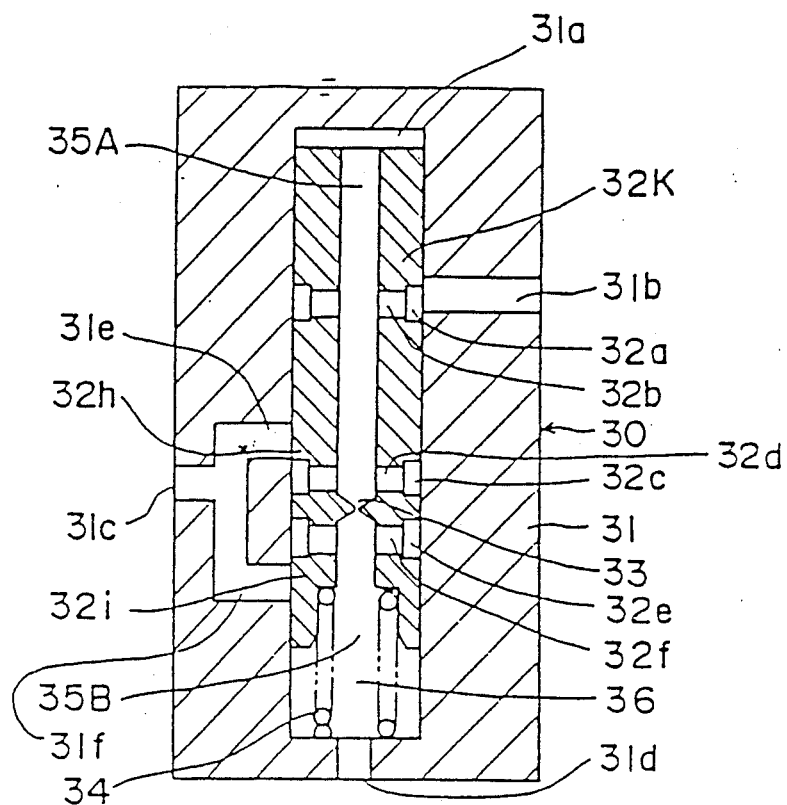
FIGS. 2b and 2c are cross sectional views explanatory of the operation of a flow control valve.

Referring to FIG. 2a showing the state of normal braking operation, i.e., without the anti-lock brake control, a wide fluid passage is ensured in the passage area switching means 7. In this case, the working fluid is led from the master cylinder 2 to the inlet 31b of the flow control valve 30, flowing through the main fluid passage L1 via the first port 71a to the fluid passage 71d of the large diameter, and the fluid passage 71e of the small diameter to the third port 71c.

In the above normal condition, the spool 32 in the flow control valve 30 is urged up by the compression spring 34. Therefore, a wide fluid passage is ensured from the inlet 31b through the outer peripheral groove 32a, fluid passage 32b, fluid passage 35A, fluid passage 32d, outer peripheral groove 32c, outlet 31e to the first outlet 31c. Thus, the working fluid discharged in accordance with the stepping force of the brake pedal 1 is fed to the wheel brake 4 from the master cylinder 2 through the large fluid passage in the passage area switching means 7, and also the wide fluid passage obtained in the flow control valve 30, to thereby control the wheel brake.

In contrast, when the brake pressure is reduced for the anti-lock brake control, the solenoid valve 5 is opened, and the working fluid in the pressure reducing chamber 36 is discharged to the recirculating passage L2 from the second outlet 31d, which in turn passes through the solenoid valve 5 into the reservoir 8. In the flow control valve 30, because of the discharge of the working fluid from the pressure reducing chamber 36, a difference in pressure is generated between the opposite sides of the orifice 33 in the spool 32, moving the spool downwards. Then, when the spool 32 is located at the position shown in FIG. 2b, the communication between the outer peripheral groove 32c and the outlet 31e is interrupted by an edge 32h of the groove 32c, thereby closing the wide fluid passage in the flow control valve 30. When the spool 32 is further moved downwards, an edge 32i is opened thereby communicating the groove 32e with the outlet 31f. Accordingly, the fluid passage of the reduced pressure is communicating from the first outlet 31c through the outlet 31f, groove 32e, fluid passage 32f, pressure reducing chamber 36 to the second outlet 31d, and the working fluid is recirculated from the wheel brake 4 through the recirculating passage L2 to be stored in the reservoir 8. During the above anti-lock condition, the pump 6 is driven by the motor 61 to recirculate the working fluid through the recirculating passage L2 to the second port 71b of the passage area switching means 7.

Figure 2C:
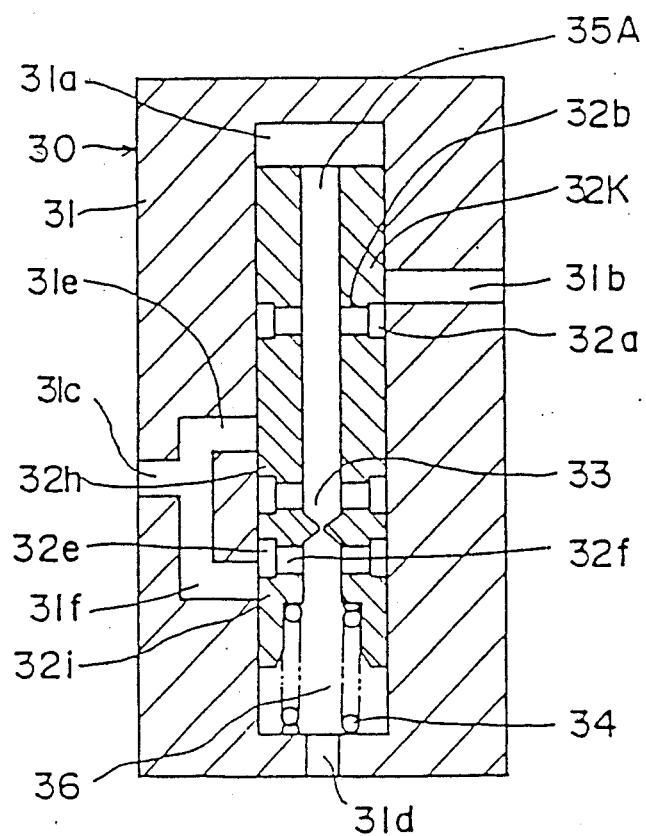

When the fluid pressure is increased in the anti-lock condition and the solenoid valve 5 is powered off, the working fluid stops flowing out from the second outlet 31d, whereby in the state shown in FIG. 2c, a narrow fluid passage is formed from a variable orifice constituted by the inlet 31b and an edge 32k through the outer peripheral groove 32a, fluid passage 32b, first fluid passage 35A, orifice 33, second fluid passage 35B, fluid passage 32f, outer peripheral groove 32e, outlet 31f to the first outlet 31c.

In this case, the opening of a variable orifice defined by an edge 32k is automatically adjusted so that the flow is always constant irrespective of the pressure difference between the inlet 31b and the first outlet 31c. In other words, the urging force resulting from the pressure difference between the opposite sides of the orifice 33 balances with the urging force of the spring 34. It is so arranged that the pressure difference is maintained at a predetermined value determined by the urging force of the spring 34 and the effective sectional area of the spool 32. Therefore, if the urging force of the spring 34 is reduced, a small amount of the fluid transfer is obtained even with the orifice 33 of a relatively large diameter, thereby to reduce the rate of increase of the brake pressure in the anti-lock condition. As a result of this, the system including the modulator according to the present invention is readily applicable to a small-sized automobile equipped with wheel brakes which require a relatively small amount of working fluid.

When the pump 6 is in operation during the anti-lock condition, the movable element 72 is moved upwards in the passage area switching element 7, similarly to the case of the first embodiment, due to the working fluid discharged from the pump 6 through the second port 71b. The fluid passage 71d of the large diameter is closed by the conical upper surface 72a of the movable element 72, and the working fluid discharged from the pump 6 passes only through the fluid passage 71e of the small diameter to the first port 71a. Thus, only a part of the pressure pulsations of the working fluid discharged from the pump 6 can be transmitted to the master cylinder 2 and the pedal 1. According to the second embodiment, unlike the first embodiment, the third port 71c is additionally provided in the passage area switching means 7, and the movable element 72 is placed in the recirculating passage on the side closer to the pump 6 than the recirculation point. Therefore, even when the gap 71f between the outer peripheral surface of the movable element 72 and the inner peripheral surface of the fluid chamber 71 is rendered smaller, no problem is brought about in transmitting the pressure from the master cylinder to the wheel brakes during the normal braking operation. The gap 71f can accordingly be made smaller. Moreover, if the gap 71f is made smaller, most of the working fluid from the pump 6 comes to act on the movable element 72 and can move this element 72 in sensitive response to the fluid. Accordingly, the damping of pressure pulsations of the working fluid from the pump 6 to the master cylinder 2 and the pedal 1 can be promptly initiated.

Figure 3:
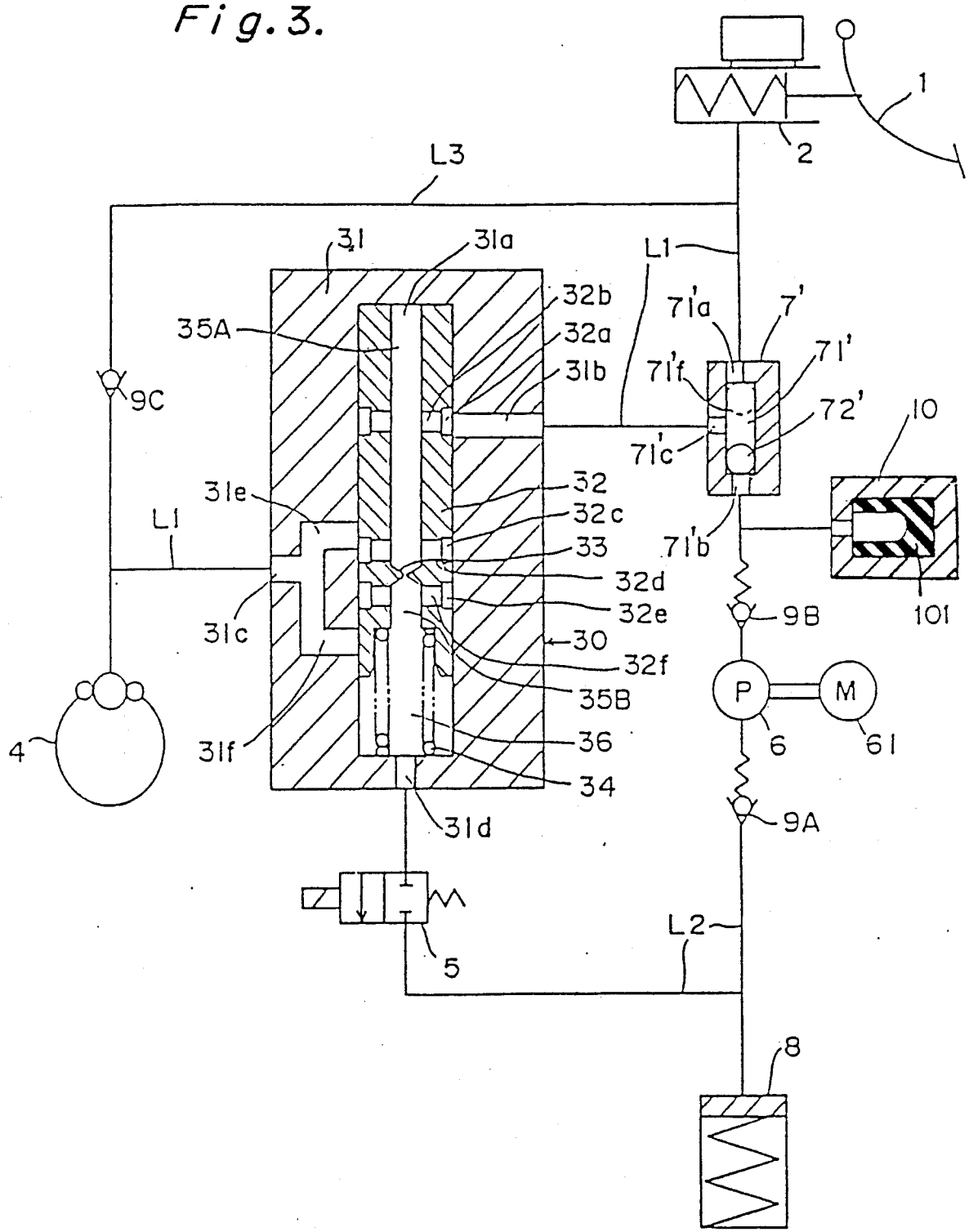
FIG. 3 is a view similar to FIG. 1, which particularly shows a modulator according to a third embodiment of the present invention.

FIG. 3 depicts an anti-lock brake control system provided with a modulator according to a third embodiment of the present invention, wherein the structure of the passage area switching means is different from that of the second embodiment, with a pressure absorbing means 10 being added between the area switching means 7' and the pump 6.

In the third embodiment, a chamber 71' of the passage area switching means 7' in the form of a cylinder is provided with a first port 71'a at a corner of its upper end to be communicated with the master cylinder 2, a second port 71'b in the center of its lower end to be communicated with the pump 6, and a third port 71'c in the center of its side wall to be communicated with the flow control valve 30. A fluid chamber 71' is so shaped, as shown in FIG. 3, as to have the same sectional area in the longitudinal direction. A spherical movable element 72' is accommodated in the fluid chamber 71' in a vertically movable manner. The movable element 72' is so placed as to keep a small gap 71'f from the inner peripheral surface of the fluid chamber 71'. When the working fluid discharged from the pump 6 enters from the second port 71'b into the fluid chamber 71', the flow of the fluid moves the movable element 72' upwards, which passes by the third port 71'c to the position shown by a chain line, so that the area of the fluid passage towards the first port 71'a is reduced.

On the other hand, in a normal state (when the working fluid discharged from the pump 6 does not flow into the fluid chamber 71' from the second port 71'b), the movable element 72' is located at the bottom of the fluid chamber 71' by the gravity, and therefore, the flow of the working fluid from the first port 71'a to the second port 71'b is interrupted, thus functioning as a check valve.

In the recirculating passage L2 between the second port 71'b and the discharge opening 6a of the pump 6, a pressure absorbing means 10 is provided in which an absorber 101 made of a material having low rigidity, for example, a high molecular elastic material or the like is accommodated. The pressure absorbing means 10 functions to reduce the pressure pulsations of the working fluid discharged from the pump 6. Moreover, the above-described check valve contributes to prevent the increase of fluid consumption due to the pressure absorbing means 10 during the normal braking operation. Because of this, the pedal stroke is not unnecessarily increased. The pressure absorbing means 10 can also take the form of piston urged by a spring.

In the above-described third embodiment, the gap 71'f serves both as a throttle in the main fluid passage L1 and a throttle to let the movable element 72' generate the driving force in the anti-lock condition. However, it may be possible, as in the second embodiment, that a throttle corresponding to the fluid passage 71e is provided in the main fluid passage L1 parallel to the first port 71'a, and the third port 71'c is formed at a position corresponding to that of the third port 71c of FIG. 2a.

As has been fully described above, according to the present invention, when the anti-lock brake control is effected, the working fluid is discharged to the recirculating passage from the wheel brake, and recirculated towards the master cylinder 2 by the pump provided in the recirculating passage. Since the anti-lock brake control system is provided with a passage area switching means, which constitutes a modulator of the present invention, for changing the area of the passage of the working fluid in the main fluid passage connecting the master cylinder and the wheel brake, the passage area is reduced when the pump is operated in the anti-lock condition. Accordingly, pressure pulsations of the working fluid generated by the operation of the pump can be restricted from being directly transmitted to the brake pedal through the master cylinder. Furthermore, the passage area switching means is so simple in structure, having the movable element accommodated in a vertically movable manner in the fluid chamber, that the increase in the manufacturing cost and size of the unit can be minimized.

Moreover, when the normal braking operation is carried out, i.e, when the pump is not driving the working fluid into the fluid chamber, the movable element is moved downwards by gravity to ensure a wide fluid passage through the passage area switching means. Therefore, such inconveniences as the delay in effectuation of the brake or returning of the pedal are not brought about during the normal braking operation. In addition, since it is so arranged that the whole of the working fluid discharged from the pump does not pass through the throttle forming a narrow fluid passage, it is advantageously prevented that the load imposed upon the pump is unnecessarily increased.

Although the present invention has been fully described by way of examples with reference to the accompanying drawings, it is to be noted here that various changes and modifications will be apparent to those skilled in the art. Therefore, unless otherwise such changes and modifications depart from the spirit and scope of the present invention, they should be construed as included therein.

What is claimed is:

1. In an anti-lock brake control system for an automobile comprising:
    a master cylinder;
    a main fluid passage communicating between the master cylinder and at least one wheel brake;
    a recirculating passage branched off from the main fluid passage for recirculating a fluid medium back to the main fluid passage via a recirculation point located upstream of a branch point with respect to the direction of flow towards the wheel brake;
    a pump disposed in the recirculating passage for recirculating the fluid medium;
    a pressure adjusting means for reducing a brake pressure of the wheel brake by discharging the fluid medium from the wheel brake to the recirculating passage, and for increasing the brake pressure by supplying the fluid medium through the main fluid passage to the wheel brake; and
    an anti-lock modulator provided with a fluid chamber formed therein, said fluid chamber having a first port communicating with the master cylinder at the upper end thereof and a second port communicating with the pump at the lower end thereof, and with a movable element vertically movably accommodated in said fluid chamber, said movable element being normally located at a lower position in said fluid chamber by gravity and moved upwards by the flow of the fluid medium discharged from the pump, said movable element reducing an effective area of the main fluid passage when said movable element is moved upwards in said fluid chamber.

2. The anti-lock brake control system according to claim 1, wherein said second port is communicating with said recirculation point.

3. The anti-lock brake control system according to claim 1, wherein said first and second ports are respectively formed at the upper and the lower portions of said fluid chamber, and a third port communicating with the pressure adjusting means is formed in the middle of said first and second ports, so that said fluid chamber serves as said recirculation point.

4. The anti-lock brake control system according to claim 3, wherein said fluid chamber is provided with two fluid passages of different diameters both communicating with said first port, the fluid medium flow from the master cylinder into the pressure adjusting means being only allowed to pass through one of said two fluid passages having a smaller diameter when said movable element is moved upwards by the operation of the pump.

5. The anti-lock brake control system according to claim 3, wherein said movable element is normally located below said third port and is moved upwards to pass by said third port when said pump is operated.

6. The anti-lock brake control system according to claim 3, further comprising a check valve means provided between said fluid chamber and the pump so as to permit the fluid medium to normally flow in a direction from the pump towards said fluid chamber, and a pressure absorbing means having low rigidity provided between the pump and said check valve means.

7. The anti-lock brake control system according to claim 6, wherein said movable element comprises a valve body of said check valve means for preventing the fluid medium from flowing from said fluid chamber to said third port when said movable element is normally located in a lower portion of said fluid chamber.

* * * * *